United States Patent
Hsu et al.

(10) Patent No.: US 11,314,996 B1
(45) Date of Patent: *Apr. 26, 2022

(54) EMBEDDED LINE PATTERNS USING SQUARE-WAVE LINECODE

(71) Applicant: Idemia Identity & Security USA LLC, Billerica, MA (US)

(72) Inventors: Rein-Lien Hsu, Edison, NJ (US); Brian K. Martin, McMurray, PA (US); Yecheng Wu, Lexington, MA (US)

(73) Assignee: Idemia Identity & Security USA LLC, Billerica, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/892,752

(22) Filed: Jun. 4, 2020

Related U.S. Application Data

(60) Provisional application No. 62/857,007, filed on Jun. 4, 2019.

(51) Int. Cl.
G06K 19/06 (2006.01)

(52) U.S. Cl.
CPC .............................. G06K 19/06009 (2013.01)

(58) Field of Classification Search
CPC .. G06K 19/06009; G06K 7/143; G06F 16/93; G06F 16/9035
USPC ........................................................ 235/494
See application file for complete search history.

(56) References Cited

U.S. PATENT DOCUMENTS

| | | | |
|---|---|---|---|
| 4,547,895 A | 10/1985 | Mita | |
| 4,629,215 A | 12/1986 | Maurer | |
| 4,633,328 A | 12/1986 | Saito | |
| 4,719,450 A | 1/1988 | Yamauchi | |
| 5,410,642 A | 4/1995 | Hakamatsuka et al. | |
| 5,761,686 A | 6/1998 | Bloomberg | |
| 6,000,728 A * | 12/1999 | Mowry, Jr. | ............ B41M 3/146 283/902 |

(Continued)

FOREIGN PATENT DOCUMENTS

EP          1432234          9/2011

OTHER PUBLICATIONS

Al-Hamami et al., "A new approach for authentication technique," Journal of Computer Science, 2005, 1(1):103-106, 4 pages.

(Continued)

*Primary Examiner* — Ahshik Kim
(74) *Attorney, Agent, or Firm* — Adam Foster Lewental; Robert Facey

(57) ABSTRACT

Methods and systems, including computer programs encoded on a computer storage medium, are used for generating an identification document comprising an image of an individual, personal information associated with the individual, and line patterns that include multiple distinct square-wave lines. The square-wave lines enable credential data about a person assigned to the identification document to be securely stored at the identification document. A first portion of distinct square-wave lines are used to encode a first item of credential data and to determine whether the image of the individual corresponds to the first item of credential data. A second portion of distinct square-wave lines are used to encode a second item of credential data and to determine whether the personal information corresponds to the second item of credential data.

20 Claims, 9 Drawing Sheets

(56) References Cited

U.S. PATENT DOCUMENTS

| | | |
|---|---|---|
| 6,210,777 B1 | 4/2001 | Vermeulen et al. |
| 6,843,422 B2 | 1/2005 | Jones et al. |
| 7,043,052 B2 | 5/2006 | Rhoads |
| 7,152,786 B2 | 12/2006 | Brundage et al. |
| 7,207,494 B2 | 4/2007 | Theodossiou et al. |
| 7,277,891 B2 | 10/2007 | Howard et al. |
| 7,593,542 B2 | 9/2009 | Abe et al. |
| 7,706,565 B2 | 4/2010 | Levy et al. |
| 7,789,311 B2 | 9/2010 | Jones |
| 7,804,982 B2 | 9/2010 | Howard et al. |
| 7,824,029 B2 | 11/2010 | Jones et al. |
| 7,974,877 B2 | 7/2011 | Ramanathan et al. |
| 8,054,509 B2 | 11/2011 | Saka et al. |
| 8,160,294 B2 | 4/2012 | Takahashi et al. |
| 8,560,556 B2 | 10/2013 | Fitterer |
| 8,783,580 B2 | 7/2014 | Lesur |
| 9,246,741 B2 | 1/2016 | Eswaran et al. |
| 9,390,460 B2 | 7/2016 | Caton et al. |
| 9,906,360 B2 | 2/2018 | Johnson et al. |
| 10,457,086 B2 * | 10/2019 | Jones ............... B42D 25/309 |
| 11,037,213 B2 | 6/2021 | Wu et al. |
| 2002/0170966 A1 | 11/2002 | Hannigan et al. |
| 2003/0116630 A1 | 6/2003 | Carey et al. |
| 2004/0049401 A1 | 3/2004 | Carr et al. |
| 2004/0250142 A1 | 12/2004 | Feyler |
| 2005/0109850 A1 | 5/2005 | Jones |
| 2006/0171558 A1 | 8/2006 | Alattar et al. |
| 2008/0301464 A1 | 12/2008 | Parkinson |
| 2009/0315316 A1 * | 12/2009 | Staub ............... B42D 25/00 283/72 |
| 2010/0295289 A1 | 11/2010 | Doublet et al. |
| 2011/0266348 A1 | 11/2011 | Denniston, Jr. |
| 2011/0266349 A1 | 11/2011 | Bi et al. |
| 2013/0301870 A1 | 11/2013 | Mow et al. |
| 2015/0151562 A1 | 6/2015 | Whiteman et al. |
| 2016/0055368 A1 | 2/2016 | Cao et al. |
| 2016/0339733 A1 * | 11/2016 | Holmes ............ B42D 25/328 |
| 2018/0130108 A1 * | 5/2018 | Wu .................. G06Q 50/265 |
| 2018/0186167 A1 | 7/2018 | Jones et al. |
| 2020/0139743 A1 | 5/2020 | Jones et al. |
| 2020/0193495 A1 | 6/2020 | Wu |
| 2021/0206193 A1 | 7/2021 | Jones et al. |

OTHER PUBLICATIONS

International Search Report and Written Opinion in International Application No. PCT/US2017/069043, dated Mar. 1, 2018, 11 pages.

International Search Report and Written Opinion in International Application No. PCT/US2017/060926, dated Jan. 16, 2018, 8 pages.

* cited by examiner

EMBEDDED LINE PATTERNS USING SQUARE-WAVE LINECODE

FIELD

The present specification is related to physical and digital identifications.

BACKGROUND

User identifications such as driver licenses can be issued either as physical identification cards or digital identifications. A physical identification card is issued by creating a card that includes customer information, whereas a digital identification is issued in an electronic format and accessed on a client device. Both physical and digital identifications are commonly used for verifying the identity of an individual, providing access to restricted areas, or authorizing an individual to purchase age-restricted content.

Security features in identification cards can include perceptible security marks and imperceptible watermarks that are invisible or imperceptible to the human eye. The perceptible security marks may be difficult to forge in materials used to produce the identification cards, while the imperceptible watermarks may be difficult to detect visually but easy to duplicate when an identification card is copied or counterfeited. An example digital watermark often requires a "host" region that is rich in texture to hide certain information in an image included on an identification document (a digital identification document or mobile driver's license (mDL)).

For example, a digital watermark signal associated with the digital watermark becomes relatively visible as noisy random patterns if the digital watermark is hidden in a plain area rather than the host region. Such a demand of texture richness for hosting a digital watermark imposes a limit on the amount of data payloads that digital watermarks can carry.

SUMMARY

This document describes techniques that can be used to automatically generate, detect, and decode linecode via perceptible line patterns that encode personal information on identification documents. The line patterns may be perceptible line patterns that complement one or more security features of imperceptible watermarks. The line patterns are configured to provide more efficient detection of security features that are embedded at an identification document. Further, the line patterns are configured to provide larger data payloads that may be assigned to the embedded features relative to data payloads that may be provided by conventional approaches to encoding information on an identification card.

The techniques described in this document also include unique methods and processes for applying or integrating the lines patterns on an identification (ID) document, such as an ID card, a driver's license, or an electronic/digital mobile driver's license (mDL). For example, rather than using plain line segments, the described techniques include modulating a square wave by applying line code data in an example maximum duration so that a resultant non-periodic waveform is immersed among other background lines that may be included on an identification document.

One aspect of the subject matter described in this specification can be embodied in an identification document. The identification document includes personal information associated with the individual; and line patterns including: multiple distinct square-wave lines operable to store, at the identification document, credential data about a person assigned to the identification document; and wherein a first portion of distinct square-wave lines encodes a first item of credential data and is used to determine whether the personal information corresponds to the first item of credential data.

These and other implementations can each optionally include one or more of the following features. For example, in some implementations, the identification includes an image of an individual; and wherein a second portion of distinct square-wave lines encodes a second item of credential data and is used to determine whether the image of the individual corresponds to the second item of credential data. In some implementations, each line pattern included at the identification document corresponds to an imperceptible square-wave that is embedded at the identification document to encode the credential data associated with the individual.

In some implementations, the line patterns are formed from square-wave lines that are integrated at particular regions of the identification document to provide a secure means of storing, at the identification document, respective items of credential data. In some implementations, each respective item of credential data is associated with a distinct portion of personal information about a person or entity that is assigned to the identification document. In some implementations, the first portion of distinct square-wave lines are included at a first region of the identification document and in the image of the individual to depict physical features of the individual.

In some implementations, the second portion of distinct square-wave lines are included at a second, different region of the identification document with one or more background lines of the identification document. In some implementations, the first item of credential data is at least one of: i) a secure facial template of the person that is assigned to the identification document; or ii) a web address link that that enables a detector device to obtain a corresponding data record including identifying information about the person assigned to the identification document. In some implementations, the second item of credential data is a government issued identification number that is linked to the individual or data representing a biometric attribute of the person.

One aspect of the subject matter described in this specification can be embodied in a computer-implemented method for generating an identification document. The method includes obtaining personal information about an individual; determining a mapping of respective items of the personal information to a line pattern that is operable to encode the personal information; and generating the identification document using the personal information and the line pattern, including: i) embedding, at the identification document, multiple distinct square-wave lines that form the line pattern, wherein a first portion of distinct square-wave lines are operable to store a first item of the personal information at the identification document; and ii) integrating, at the identification document, a second item of the personal information with the first item in response to printing the personal information on the identification document.

These and other implementations can each optionally include one or more of the following features. For example, in some implementations, the first portion of distinct square-wave lines encodes the first item of the personal information at the identification document and the method includes:

determining whether credential data representing the first item corresponds to the personal information printed on the identification document.

In some implementations, obtaining the personal information includes obtaining an image of the individual; the personal information printed on the identification document includes the image; the first item of the personal information corresponds to the image; and the credential data is a secure facial template. In some implementations, determining whether the credential data representing the first item corresponds to the personal information printed on the identification document includes: determining whether the secure facial template corresponds to the image printed on the identification document. In some implementations, the first portion of distinct square-wave lines are included at a first region of the identification document and the method includes: embedding, at the identification document, a second portion of distinct square-wave lines that form the line pattern. In some implementations, the second portion of distinct square-wave lines are operable to store a third item of the personal information at the identification document and are embedded in the image of the individual.

In some implementations, the line pattern is an imperceptible square-wave that is embedded at the identification document to encode credential data corresponding to multiple items of personal information about the individual. In some other implementations, the line pattern is formed from square-wave lines that are integrated at particular regions of the identification document to provide a secure means of storing respective items of credential data at the identification document; and each respective item of credential data is associated with a distinct item of personal information about a person or entity that is assigned to the identification document.

Other implementations of this and other aspects include corresponding systems, apparatus, and computer programs, configured to perform the actions of the methods, encoded on computer storage devices. A computing system of one or more computers or hardware circuits can be so configured by virtue of software, firmware, hardware, or a combination of them installed on the system that in operation cause the system to perform the actions. One or more computer programs can be so configured by virtue of having instructions that, when executed by data processing apparatus, cause the apparatus to perform the actions.

The details of one or more implementations are set forth in the accompanying drawings and the description below. Other potential features and advantages will become apparent from the description, the drawings, and the claims.

Other implementations of these aspects include corresponding systems, apparatus and computer programs, configured to perform the actions of the methods, encoded on computer storage devices.

BRIEF DESCRIPTION OF THE DRAWINGS

In the drawings, like reference numbers represent corresponding parts throughout.

DETAILED DESCRIPTION

A system is described that is configured to generate identification documents that include distinctive line patterns formed using square-wave lines for securely encoding different portions of personal information at the identification document.

For example, the system may construct photographic images for a document, such as a customer photo, a background pattern, or a portion of text, using line patterns that correspond to length-modulated square-waves. In some cases, each line pattern can correspond to an imperceptible square-wave that is embedded at the identification document. Hence, the line patterns can be multiple distinct portions of square-wave lines that are integrated at (e.g., on) an identification document to securely store personal information about an individual that is associated with the identification document.

The system can associate each line pattern with a corresponding portion of secure personal information. The system can also place multiple distinct portions of square-wave lines in different regions of a photographic image such that the lines are visible at the identification document. The system is configured to verify authenticity of an identification document by extracting linecode that corresponds to the line patterns integrated at the identification document. For example, the system extracts encoded credential data representing secure personal/customer information that is stored or encoded at the identification document using the line patterns that include multiple length-modulated square-waves line.

In general, the described system provides an automated document security system that is operable to encode user credential data, generate linecode using corresponding square-wave lines, and render or integrate the linecode on an identification document in square waveforms, such that the linecode is encoded (e.g., hidden or concealed) inside the waveform pulse trains. The linecode embedded at the identification document is detectable by a detector device and is capable of being decoded, using a decoding engine of the detector device, irrespective of card alignment errors or scanning noise that can occur during operations for authenticating an identification document.

A "customer" may refer to a user or individual. For example, a customer may be an individual with a physical identification card that may be a driver's license issued by a department of motor vehicles of a territory or a municipality. In other instances, the identification card may be other types of identifications such as a social security card, a passport, a birth certificate, or other government or company-issued identification cards.

Figure 1A:
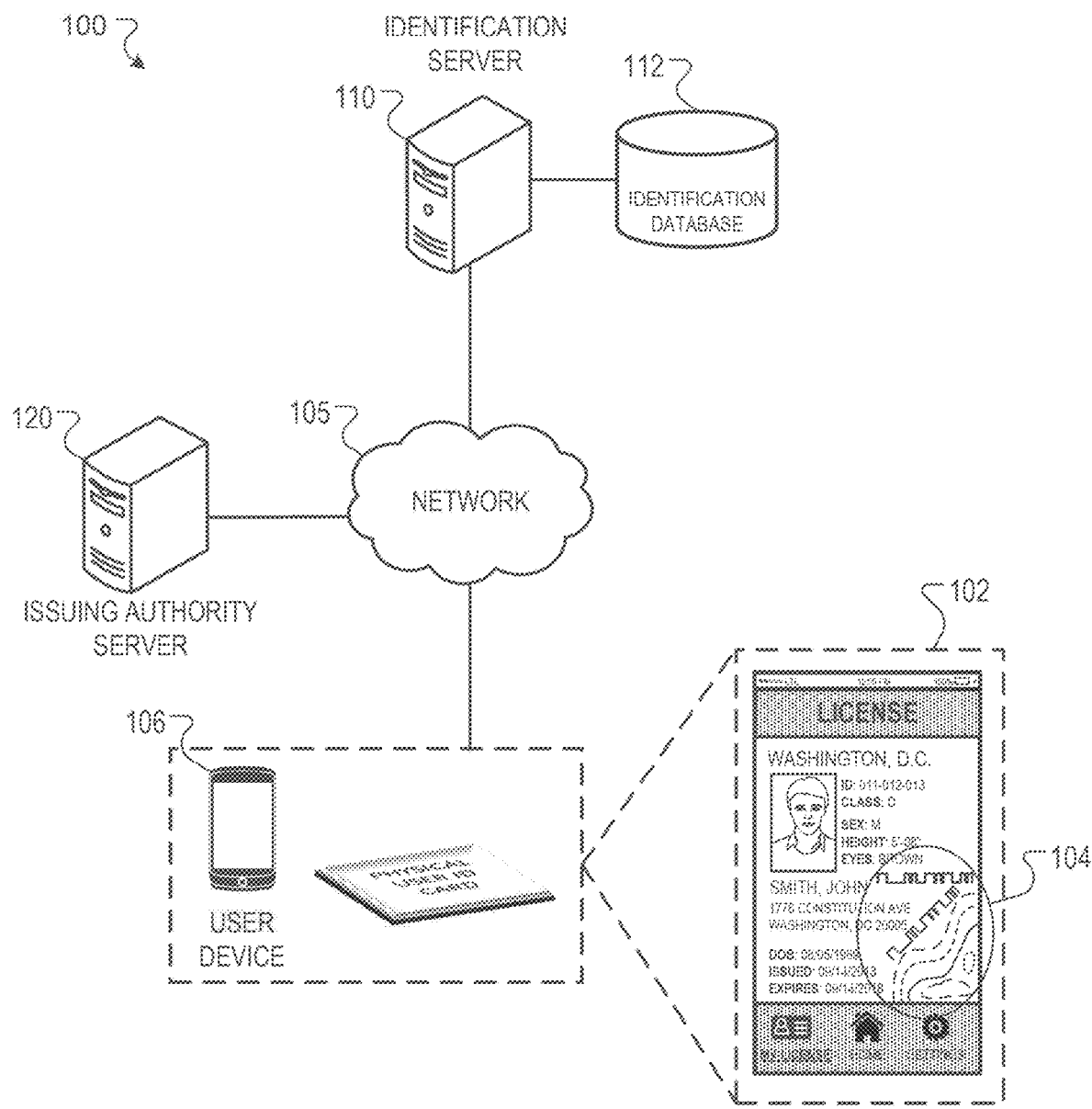
FIG. 1A illustrates an example computing system associated with an identification document that includes embedded line patterns.

FIG. 1A illustrates an example computing system 100 associated with an identification document 102 that includes embedded line patterns 104. System 100 includes various computing elements that can be used in association with the identification document 102. For example, the system 100 generally includes a computing network 105, an identification server 110, and an identification database 112. In some implementations, the system 100 includes an issuing authority server 120 and an example client device.

As described in more detail below, the identification server 110, identification database 112, issuing authority server 120, and client device can each communicate or exchange data communications over computing network 105. Network 105 can be a local area network (LAN), a wide area network (WAN), the Internet, or a combination thereof. For example, these computing elements of system 100 exchange data communications, via network 105, to perform operations associated with generating an identification document 102 that includes embedded line patterns 104. Likewise, the computing elements of system 100 can exchange data communications to perform operations associated with validating authenticity of an identification document 102 that includes embedded line patterns 104.

The digital identification server 110 exchanges communications with the identification database 112 to securely obtain or store different types of personal information about an individual. For example, the identification database 112 can include data records forming a set of personal information for respective individuals or customers. Each respective customer can be assigned or linked to an identification document 102 as an owner of that identification document. For instance, the identification database 112 can have data entries/records that are associated with a specific individual. The data records can include various types of personal identity information about that specific individual. For example, the data records can include personal identity information such as the person's social security number, address, date of birth, eye color, hair color, height, weight, medical information, or disability information.

In some implementations, each server 110, 120 of the system 100 can include one or more processors, memory, and data storage devices (e.g., non-transitory storage devices) that collectively form the system 100. The processors of the respective server 110, 120 process instructions for execution by devices and components of the system, including instructions stored in the memory or on storage devices for performing operations/actions described in this document.

In other implementations, multiple processors may be used, as appropriate, along with multiple memories and types of memory. For example, devices and components of the servers may be connected with multiple other computing devices, with each device (e.g., a server bank, groups of servers, or a multi-processor system) performing portions of the actions or operations associated with the processes or logical flows described in this specification.

Data processing functions of the server 110, 120 and other components of the system 100 can be implemented, in part, by execution of program code in the form of an executable application, otherwise known as an "app." The app can be launched or executed using a client or user device. Upon execution, the app can establish a data connection with the servers of system 100 to transmit data signals to the servers as well as receives data signals from the server.

A client device is an electronic device capable of requesting and receiving resources over the network 105. Example client devices 106 include personal computers, mobile communication devices, and other devices that can send and receive data over a computer network. In some implementations, client device 106 is a smart speaker, e.g., with an integrated display, that sends and receives data in response to voice commands from a user.

The issuing authority server 120 can be a remote server operated by an issuing authority and used to control access to secure personal information included on physical identification cards issued by the issuing authority. For example, the issuing authority server 120 can provide access to demographic information about a person, historical information associated with certain persons (e.g., previous identification cards issued, number of renewals, etc.), and/or other types of personal information. In some implementations, the issuing authority server 120 provides access to this information using authorization procedures that require validation of access credentials. For example, in response to receiving a request, from the digital identification server 110, for secure personal information, the issuing authority server 120 can require an exchange of access credentials to determine that the request is a valid request submitted by an entity that is authorized to make such requests.

The issuing authority server 120 can be queried by the digital identification server 110 for secure personal information during a process for generating a digital or physical identification document. For example, the digital identification server 110 can query the issuing authority server 120 using an identifier number associated with an individual to extract or obtain secure personal information about to individual. The obtained personal information is included on the generated digital or physical identification document 102. The issuing authority server 120 can also be accessed during an example process for validating authenticity of an identification document 102. For example, the digital identification server 110 can access the issuing authority server 120 to determine whether a particular digital or physical identification 102 includes false or fraudulent personal information indicative of a fraudulent identification document 102.

The identification document 102 can be an example digital/electronic identification document, such as an mDL, and the client device is used to display a digital image or rendering of the example digital identification document. In other examples, the identification document is a physical identification document, such as a physical driver's license, a passport card, or other physical ID card. Thus, the line patterns 104 can be embedded within a physical identification document or within a digital identification document.

In addition, the line patterns 104 can be visibly detectable, e.g., visible to a human eye. Alternatively, the line patterns 104 can be imperceptible, e.g., constructed small enough to appear invisible to the human eye or configured to blend with background lines of an identification document. In such instances, the line patterns 104 can outline micro-features (e.g., physical features) of a photograph that depicts the assigned owner of the identification document or other portions/features of the identification document 102. In some implementations, example square-waves lines of line patterns 104 may be visible to the human eye, but may not be obvious or noticeable to an individual because the line square-wave lines are blended it into a background design of an identification document. In some implementations, square-wave lines of line patterns 104 may be visible to the human eye, but may be imperceptible in the sense that the square-wave lines are not distinguishable as being a type of linecode for encoding information in an identification document.

As described herein, the line patterns 104 can resemble square-wave lines embedded or integrated at particular regions of the identification document 102. For example, a particular line pattern 104 can be formed using distinct portions of square-wave lines. Each line pattern encodes, in a secure manner, personal information about a person or individual that is assigned to the identification document 102. In some implementations, the person is a customer or cardholder that has been assigned, or is identifiable, in the identification database 112 as the owner of the identification document 102.

Figure 1B:
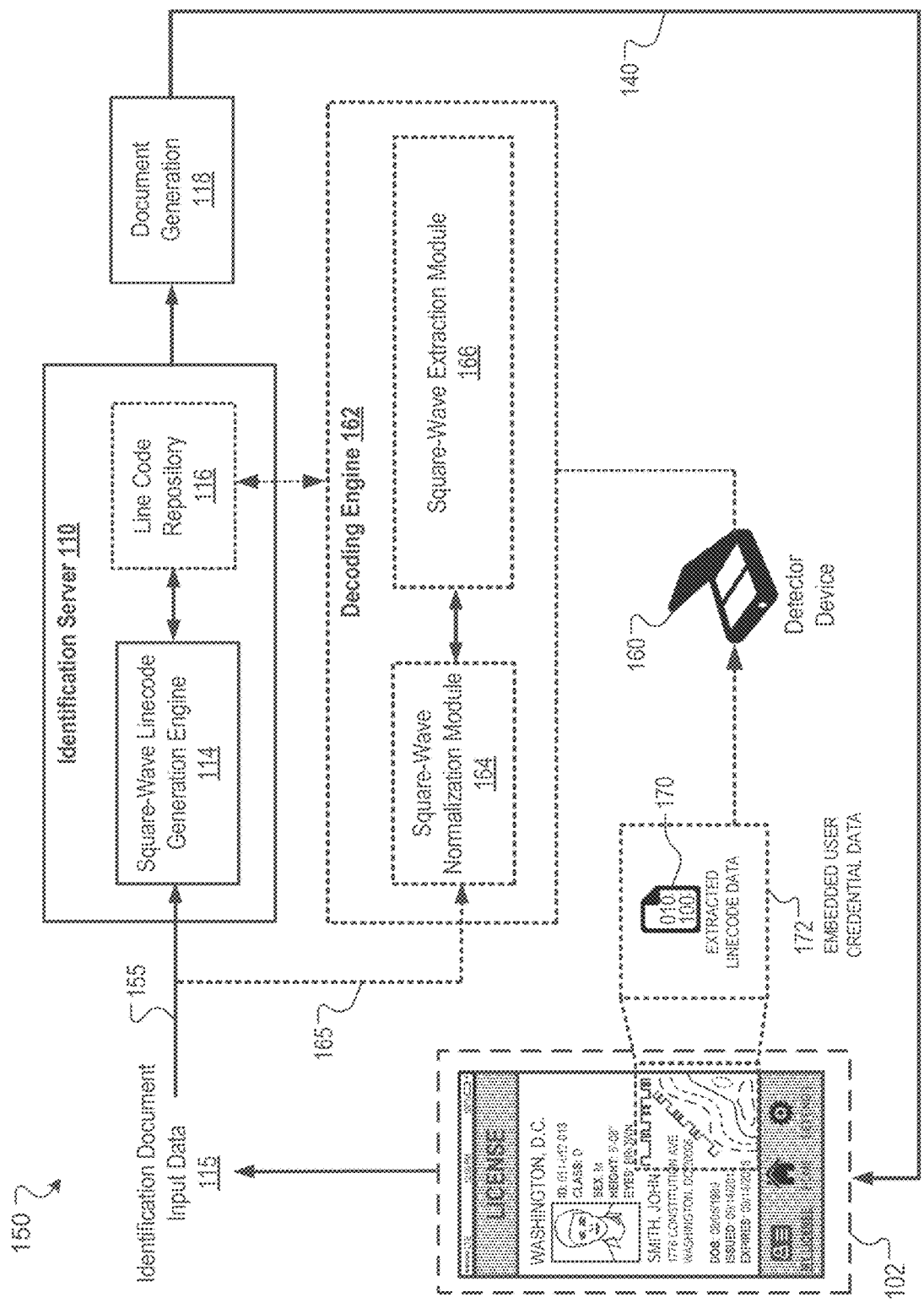
FIG. 1B illustrates an example system for generating, and validating authenticity of, identification documents with embedded line patterns.

FIG. 1B illustrates an example system 150 for generating identification documents 102 with embedded line patterns 104. System 150 is also used to validate authenticity of an identification document 102 based on the various types of square-wave lines that form line patterns 104 embedded at the identification document.

In some implementations, system 150 is a sub-system of the system 100 described above. For example, one or more of the computing elements of system 150 can be included in system 100 as a sub-system of hardware circuits, such as special-purpose circuitry, that includes one or more processor microchips. In general, system 150 can include processors, for example, a central processing unit (CPU), a graphical processing unit (GPU), or both, as well as memory and data storage devices that collectively form one or more computing elements of the system 100.

In the implementation of FIG. 1B, the digital identification server 110 includes a square-wave linecode generation engine 114 ("linecode generator 114") and a linecode repository 116. As described in more detail below, information associated with linecode repository 116 can be used to identify corresponding portions of secure personal information based on detection of line patterns 104 that embedded within an identification document 102. The linecode repository 116 can include data entries or records for respective portions of secure personal information. In some implementations, data and records included in the linecode repository 116 may be stored in the digital identification database 112. Data associated with the linecode repository 116 can be transmitted to authorized devices that perform verification of the identification document 102, such as a detector device 160 described below.

System 150 includes a first data path 155 that is used to implement processes and perform operations for generating an identification document 102. Input data 115 can include certain types of information that is used by the system 150 to generate the identification document 102. For example, the input data 115 can include data for a photographic image of a person that will be assigned as an owner of the identification document or data describing secure personal information about the person. In some examples, the data describing secure personal information about the person is obtained from the issuing authority server 120.

The system 150 includes a detector device 160 that is configure to access a decoding engine 162 (described below). For example, the decoding engine 162 can be local to the detector device 160, such as a hardware or software component integrated at the detector device 160. Alternatively, the decoding engine 162 can be a non-local resource, such as a cloud-based application that is accessed by the detector device 160 to perform decoding operations relating to authentication of an identification document. The system 150 can also include a second, different data path 165 that is used to implement processes and perform operations for authenticating or validating authenticity of a generated identification document 102. Example processes and operations for authenticating an identification document are described in more detail below.

Referring again to data path 155, the linecode generator 114 is used by the digital identification server 110 to generate multiple square-wave lines. The generated square-wave lines are used to form line patterns 104 which are then integrated or embedded at an identification document 102. For example, linecode data generated by the linecode generator 114 can describe various sets of line patterns for integration at an identification document 102. In some implementations, the linecode data is transmitted to an example hardware fabrication system that is operable to generate an identification document 102. For example, the hardware fabrication system is used to implement processes and operations for document generation (118), such as integrating or embedding square-wave lines of line pattern 104 at a physical or digital identification document.

The digital identification server 110 can associate or link distinct sets of square-wave lines for a given line pattern 104 with portions of verified credential information. In response to performing this associating or linking operation, the digital identification server 110 can then store the generated square-wave linecode in the line code/pattern repository 116. In some implementations, the identification database 112 (described above) is included within the digital identification server 110, e.g., as an example database structure of the digital identification server 110. In such implementations, the line code repository 116 can be associated with a data storage device of the identification database 112 such that the linecode repository 116 is stored within the digital identification server 110 by way of the identification database 112.

Referring now to data path 165, an identification document can be analyzed at system 100 to determine authenticity of the identification document. As discussed above, the system 150 includes a detector device 160 that accesses a decoding engine 162 to perform decoding operations relating to authentication of an identification document or identity verification of a person presenting an identification document.

For example, the line patterns 104 embedded at an identification document 102 are used, analyzed, or otherwise processed by the decoding engine 162 to verify the authenticity of the identification document. In this manner, the system 150 can be used to verify authenticity of an identification document 102 that is presented by a person to complete a transaction. Alternatively, the system 150 can be used to verify the identity of a person presenting the identification document 102 to complete the transaction.

The system 150 performs the authenticity and identity verifications based on credential data that is embedded as encoded information at the identification document. For example, the credential data can be assigned to, or encoded by, distinct portions of square-wave lines that form line patterns 104 integrated at the identification document 102. The decoding engine 162 includes a square-wave normalization module 164 and a square-wave extraction module 166. The square-wave normalization module 164 is described in more detail below with reference to FIG. 3A. The decoding engine 162 uses the square-wave extraction module 166 to verify the authenticity of an identification document 102 by extracting or obtaining linecode (described below) data 170 that corresponds to a line pattern 104 integrated at the identification document.

For example, line patterns 104 can include distinct sets of square-wave lines for embedding or encoding credential data 172. The credential data 172 represents personal information for an individual and is embedded or stored at an identification document 102 that is linked to that individual. In some implementations, a corresponding data record is generated and stored at identification database 112 when personal information for an individual is stored or embedded at identification document 102. Using the line patterns 104, the system 150 is operable to extract encoded credential data that is stored securely at the identification document 102 as secure personal/customer information.

The square-wave extraction module 166 includes, or represents, computing logic for analyzing an image of the identification document to identify and extract linecode mapped to distinct portions of square-wave lines embedded at particular regions of an identification document. The decoding engine 162 of the detector device 160 is operable to verify authenticity of an identification document 102 by extracting linecode that corresponds to the line patterns integrated at the identification document. For example, using the detector device 160, the system 150 extracts encoded credential data representing secure personal/customer information that is stored or encoded at the identification document using the line patterns that include multiple length-modulated square-waves line.

Extracting the encoded credential data can include verifying an arrangement of distinct square-wave lines that form line patterns 104 at the identification document 102. For instance, based on a generated or issued identification document 102, the system 150 is operable to detect the line patterns 104 that are embedded at the identification document 102. In response to detecting a particular arrangement of square-wave lines, the system 150 can identify corresponding types of secure personal information that are mapped to different portions of the square-wave lines.

The secure personal information for the individual is represented by credential data that is extracted for verification based on the detected arrangement of square-wave lines. The secure personal information can then be used to authenticate the identification document 102 as well as to verify the identity of a person presenting the identification document 102.

Figure 2:
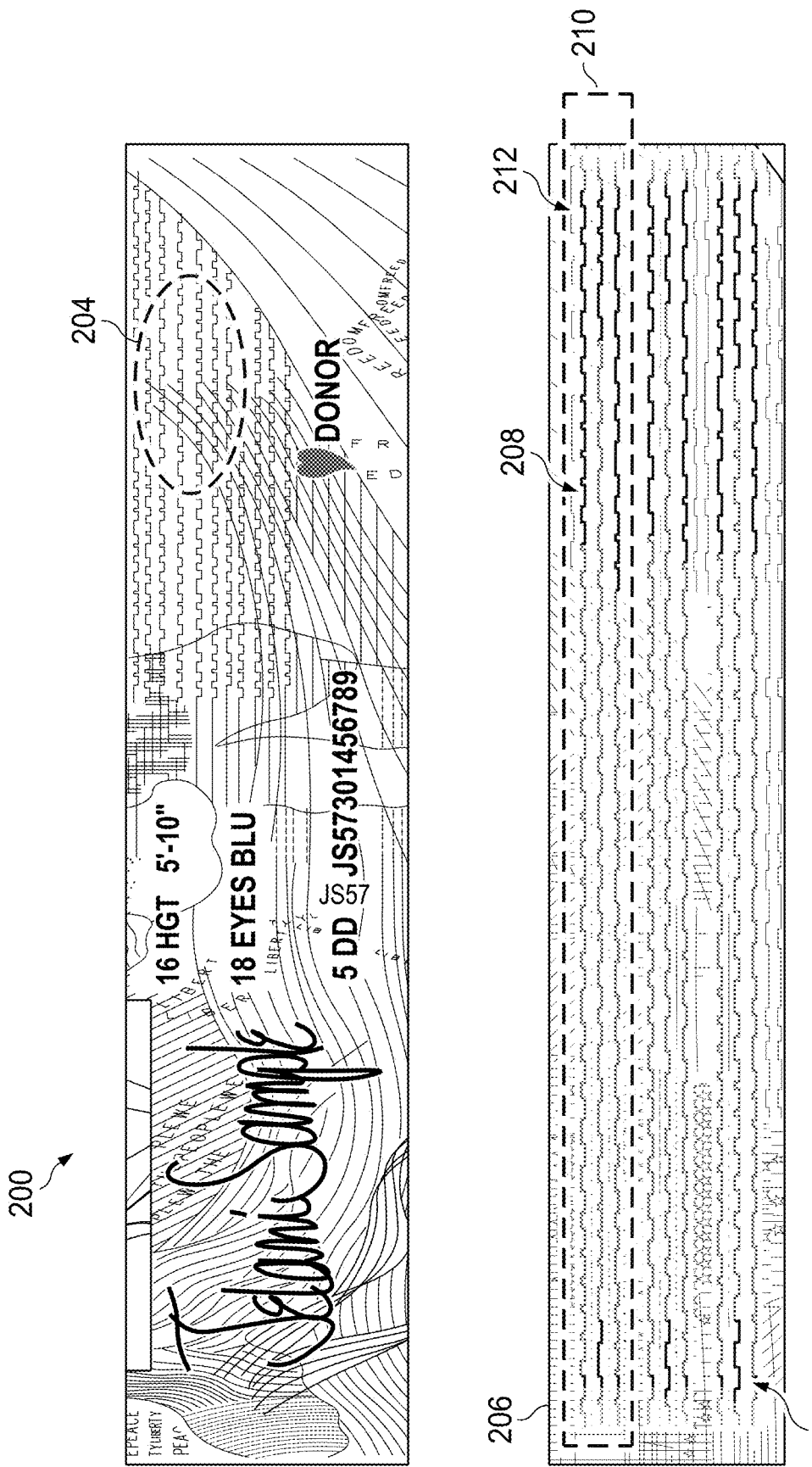
FIG. 2 illustrates an example of embedded line patterns of the identification document.

FIG. 2 illustrates an example of various sets of lines 200, including particular types of line patterns, that are embedded on an identification document for encoding or securely storing credential data linked to a person. In general, security features for identification cards or documents can include: (i) perceptible security marks, e.g., that are difficult to forge in certain types of materials; and (ii) imperceptible watermarks (e.g., digital watermarks) that are generally invisible and difficult to detect, but are sometimes easy to decode or duplicate when an identification document is counterfeited.

In some cases, digital watermarks require a "host" region that is rich in texture to hide the information in an image on an identification document. Otherwise, the watermark signal can become relatively visible as noisy random patterns if the watermark is hidden in a plain area of the identification document. Areas of an identification document that include a portrait, a special logo, or distinct drawing, can correspond to an example host region that is rich in texture for embedding a digital watermark in an image on an identification document. Such a demand of texture richness usually imposes a limit on the amount of payloads that digital watermarks can carry.

To overcome such payload limits, techniques are described for implementing an alternative to imperceptible digital watermarks, where the techniques include encoding information e.g., described as "linecode" using one or more portions of perceptible square-wave lines 204, 206. Line portions 206 show an enlarged view of the multiple portions of perceptible square-wave lines 204. In some implementations, different sets of linecode encode or store a certain amount of binary data at an identification document, such as 96 bits or 104 bits. In some cases, a set of linecode can be configured to store more or fewer bits. In other cases, a set of linecode is operable to encode an amount of binary data that is more than, or the same as, an example known digital watermark, but in a manner that is faster and more computationally efficient relative to methods for encoding data for known digital watermarks.

The amount of binary data or payload encoded by a set of linecode can be increased by adding at least one square-wave line 208 at the identification document 102. For example, the techniques described in this document can be used to overcome the payload limits associated with known digital watermarks by using multiple sets of square-wave lines 210 that are integrated or embedded on a background of an identification document or at a particular layer that includes background patterns of the identification document. In one example, three sets of square-wave lines 210 corresponds to three sets of linecode, where each of which can hold 12.5 bytes of data, i.e., 31 decimals or 104-bit data stream.

Square-wave lines can be rendered to mimic or mirror background lines of an identification document and include redundant signals 212 at each end of a square-wave line or line segment. For example, the square-wave lines that mimic or mirror a background line can include one or more redundant signals that are used to align and/or hide one end of a square-wave line that corresponds to the beginning of the square-wave line or another end of a square-wave line that corresponds to the end of the square-wave line.

In the example of FIG. 2, redundant signals 212 are illustratively shown in a darkened color or pixilation at each end of a square-wave line or line segment only to graphically indicate that redundant signals are present in the square-wave lines. Stated another way, the example darkened ends of the square-wave lines shown at FIG. 2 to indicate redundant signals 212 are for illustration only. An actual generated squared-wave line pattern that is embedded in an identification document will not have darkened portions at ends of its square-wave lines to indicate redundant signals 212. This is because the location of the redundant signals 212 will be hidden or concealed at the identification document.

In some implementations, the redundant signals provide mirroring anchor points that contrast (e.g., computationally) with a mimicked background line, so as to distinguish (e.g., computationally distinguish) the redundant square-wave line from the mimicked (or mirrored) background line. As indicated above, in some examples, the technique of rendering redundant signals 212 at the identification document can be used to align two or more square-wave line segments, such as across different sections or regions of an identification document.

The system 150 is operable to easily detect one or more mirroring anchor points to facilitate extracting actual linecode segments (e.g., 65 segments as used in the mail bar code scheme) in the decoding phase. The redundant mirrored signals are shown as darkened lines 212 at two respective ends of each square-wave line in a set of square-wave lines 210.

In some examples, an identification document includes multiple pulse-wave lines, curved lines, or both, in a background portion of the identification document. Rather than use straight lines, the linecode generator 114 is operable to modulate a length of maximum pulses for a square-wave line to encode or store credential data among background lines, or other patterns, on an identification document. For example, system 150 can generate an identification document that blends square-wave lines that encode, conceal, or otherwise securely store different items of credential data on an identification document.

In some instances, an item of credential data is encoded at the identification document using a set of perceptible square-wave lines that are visually unidentifiable as waveforms that securely encode credential data among background lines of the identification document. Hence, the described techniques include using square-waveform lines to hide a user's personal data. To accomplish this advantage, the linecode generator 114 is operable to generate square-wave line patterns that are immersed in an entire background design of an identification document.

Figure 3A:
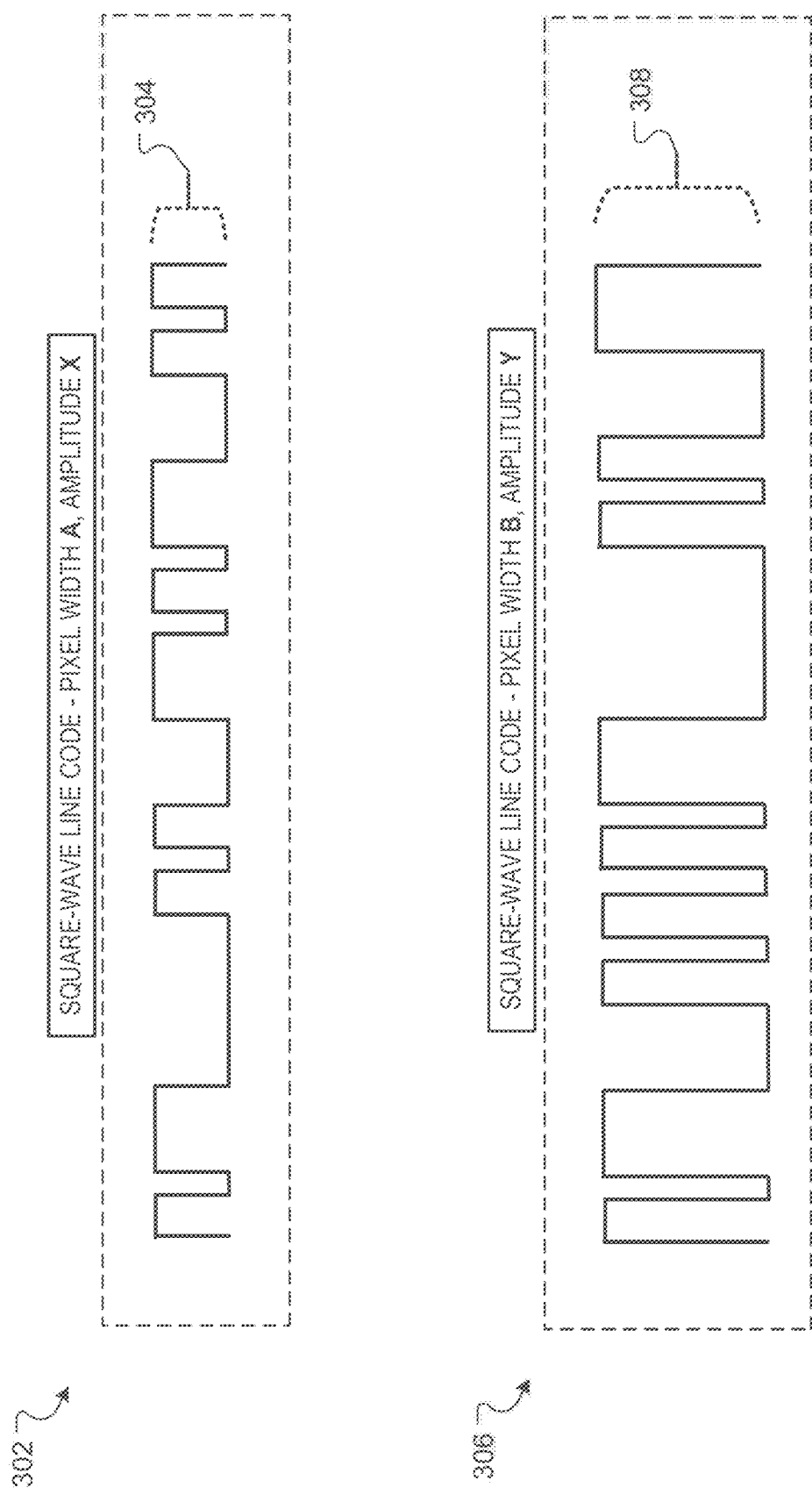
FIG. 3A and FIG. 3B illustrate examples of square-wave linecode that corresponds to line patterns embedded at an identification document.
Figure 3B:
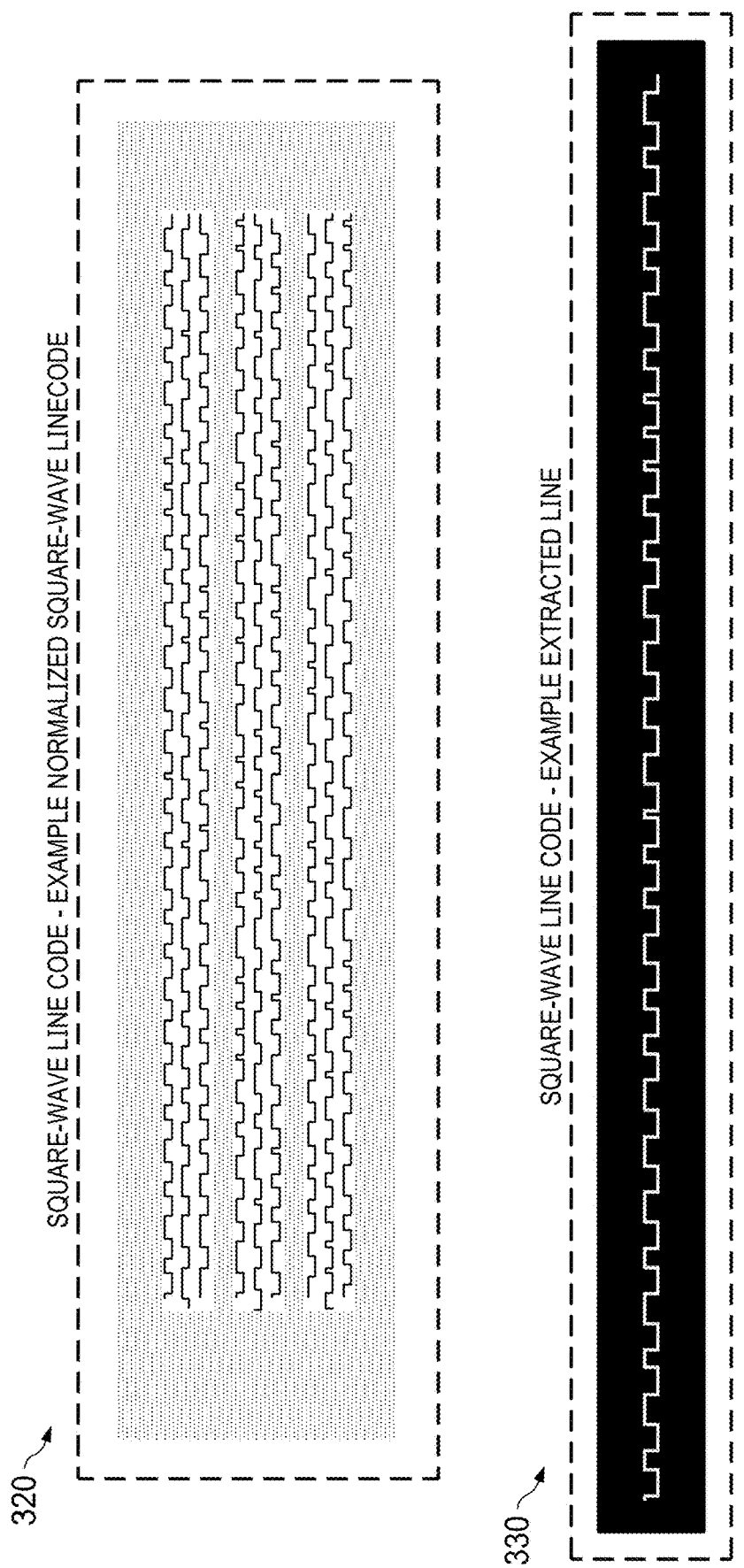

FIG. 3A and FIG. 3B illustrate examples of square-wave lines for line patterns embedded at an identification document.

Referring to FIG. 3A, square-wave line 302 is example linecode that can have a particular pixel width (or length), A, and a particular amplitude, X, whereas square-wave line 306 is example linecode that can have a particular pixel width (or length), B, and a particular amplitude, Y. In some implementations, pixel width B of square-wave line 306 is greater than pixel width A of square-wave line 302 and amplitude Y of square-wave line 306 is greater than amplitude X of square-wave line 302. Amplitude feature 304 indicates an example amplitude X of square-wave line 302, whereas amplitude feature 308 indicates an example amplitude Y of square-wave line 306.

The pixel width of a square-wave line corresponds to an example number of pixels that are used to render, show, or otherwise display a square-wave line that is integrated at a digital or physical identification document. In some cases, linecode generator 114 of system 150 is operable to split a set of single-line square-wave line segments into multiple lines. This is because a full range of linecode may cover a large area or region on an identification document and cause distortion in a detection scan initiated by detector device 160. So, to address this distortion, the system 150 is operable to split a single square-wave line 302, 306, e.g., of pixel width 6 A, 6 B, respectively, into multiple lines.

In one example, a single square-wave line 302 that has a pixel width 6 A can be split into multiple square-wave line portions, where each square-wave line portion is sized to have a particular pixel width that is based on the available space at the identification document for embedding the square-wave line 302. For example, a first square-wave line portion of square-wave line 302 can have pixel width 1.5 A, a second square-wave line portion of square-wave line 302 can have pixel width 2.5 A, and a third square-wave line portion of square-wave line 302 can have pixel width 2 A.

In some implementations, splitting an example long strip of linecode or square-wave lines is done to fit those square-wave lines into a small area of an identification document based on a certain design style of other features included on the card. Hence, the system 150 is operable to generate multi-line portions on an identification document to render and to detect square-wave linecode within small regions of interest on the document. In other implementations, to further embed square-wave linecode on an identification document, the square-wave lines can be further adjusted, e.g., to fit into small regions of interest or background layers of an identification document by changing square-wave line parameters such as thickness, pulse amplitude, pixel width, or a combination of each.

Referring to FIG. 3B, an example representation indicating a region of normalized square-wave linecode 320 ("normalized linecode 320") is shown and an example representation indicating a region of extracted square-wave linecode 330 ("extracted linecode 330") is also shown.

As discussed above, the techniques described in this document include modulating a square-wave by applying line code data in an example maximum duration so that a resultant non-periodic waveform is immersed among other background lines that may be included on an identification document. In some implementations, the linecode generator 114 employs a technique that mirrors a head or initial section of square-wave line segments so that it is not obvious to perceive where an actual credential data payload is located in a larger full-length square-wave linecode. In this manner, the line patterns can be imperceptible, invisible to the human eye, or configured to blend with background lines of an identification document.

Normalized regions of linecode are processed to eliminate background texture, such as lines or other items not associated with embedded linecode. For example, in response to identifying a region of an identification document that includes embedded square-wave lines or the presence of linecode that is mapped to a set of square-wave lines, detector device 160 accesses the normalization module 164 of decoding engine 162 to obtain normalized linecode 320. The normalization module 164 is operable to scan a region of the identification document that includes square-wave lines which are blended or immersed on the document. In some implementations, the normalization module 164 employs computing techniques for detecting, enhancing, or amplifying certain parameter values and data characteristics that are indicative of linecode mapped to one or more square-wave lines integrated at an identification document.

The normalization module 164 can employ such techniques while discarding certain other parameter values or data characteristics that are indicative of background lines, noise, or alignment errors. In some cases, the normalization module 164 includes filtering logic for filtering data associated with features or items on an identification document that are not indicative of binary data representing detected linecode. The square-wave extraction module 166 receives normalized linecode 320 from normalization module 164 and processes the normalized linecode 320 to generate extracted linecode 330.

In some examples, extracting the square-wave linecode includes extracting the square-wave linecode using a reverse binary color logic of the decoding engine 162. For example, a first line of a multi-line linecode can be extracted and shown or rendered in a reverse binary color scheme to facilitate decoding binary values of the extracted linecode 330. A region of linecode on identification document is extracted in an example detection phase, e.g., using data path 165 described above with reference to FIG. 1B. In some cases, a normalized region of linecode is processed to eliminate background texture after extraction, while in other cases a normalized region of linecode is processed to eliminate background texture prior to extraction.

In some implementations, the decoding engine 162 employs a detection and decoding algorithm for processing linecode mapped to multi-line square-wave line patterns. For example, the detection algorithm treats the square-wave lines as oriented lines, is operable to detect a dominated line orientation first, and determines a location of the region of each line based on Radon transform. The decoding engine 162 can use the normalization module 164 to refine a determined location and orientation for a set square-wave lines.

In response to this refining operation, the normalization module 164 is used to normalize a sub-image associated with the identification document to generate normalized linecode 320. The sub-image can correspond to image data for a specific region of interest at the identification document. In some cases, the normalization module 164 normalizes the sub-image of the identification document to reduce any uneven lighting detected during card/document scanning or to reduce/filter possible background textures.

The detection and decoding algorithm employed by the decoding engine 162 to process linecode associated with an identification document can include coded instructions for executing at least a subset of the following operations. The decoding engine 162 is operable to resize image data, e.g., for an input scan of an ID card/document, to a particular working dots per inch (DPI) or pixels per inch (PPI). Given an input of an approximate region of linecode (ROL) or region of interest (ROI), the decoding engine 162 can normalize the ROL and compute estimates for refining determinations associated with orientation lines and positions of lines. Similarly, the decoding engine 162 can perform computations to further refine the ROL, normalize the ROL, and binarize the ROL.

The decoding engine 162 can also parse the line segments, for example, in a line by line sequence, and rectify the detected line lengths or pixels widths for purposes of decoding the linecode that has been mapped at the identification document. The decoding engine 162 decodes the linecode as decimal values (e.g., 31 digits per line packet) and converts the decimal values to binary data (e.g., 12.5 bytes of data) as the output. In some implementations, for an example square-wave linecode of extracted linecode 330, vertical line transitions and horizontal line transitions can each delineate a separation of two-bit segments of the total number of bits allocated to a give square-wave line. In some cases, the linecode generator is configured to embed additional bits for error correction.

Figure 3C:
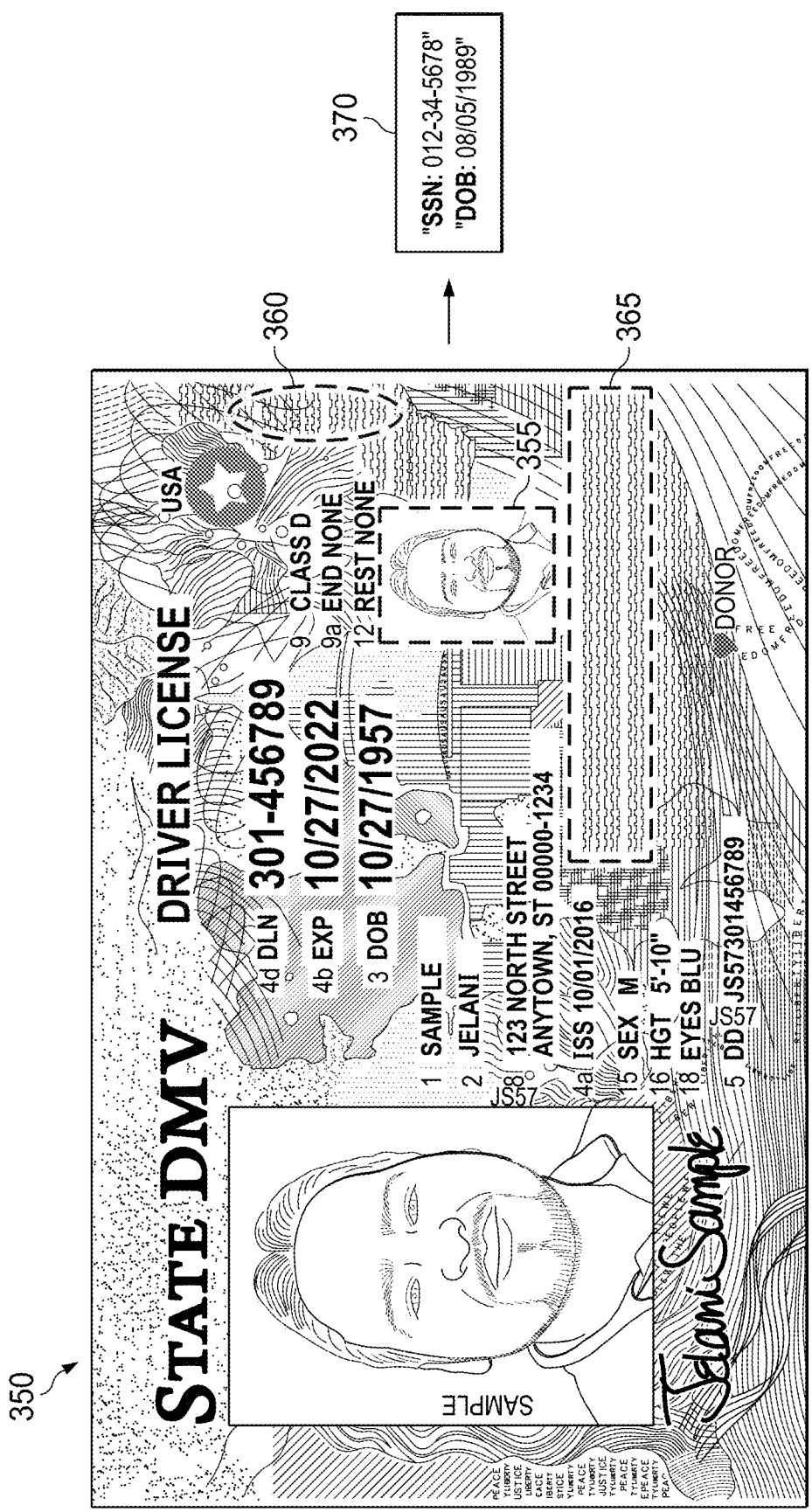
FIG. 3C illustrates examples of personal data viewable by a detector device based on encoded credential data extracted from an identification document.

FIG. 3C illustrates an identification document 350 that includes examples of personal data. The example personal data can correspond to information that is viewable by a detector device in response to extracting encoded credential data from identification document 350.

As described above, system 150 can generate an identification document 350 that blends square-wave lines for line patterns with other background lines to encode, conceal, or otherwise securely store different items of credential data on an identification document 350. The line patterns are formed from the square-wave lines and are integrated at particular regions 355, 360, 365 of the identification document 350 to provide a secure means of storing, at the identification document 350, respective items of credential data.

For example, items of credential data can correspond to a users' personally identifiable information. In some implementations, each item of credential data corresponds to a distinct portion of personal information about a person or entity that is assigned to the identification document. For example, one item of credential data can correspond to an identification number that is linked to a person, an entity, an identity record for a person/entity, or a combination of each. The identification number can be a driver's license number, a social security number, or a passport number.

In some examples, a first portion of distinct square-wave lines is included at a first region 355 of the identification document 350 and in an image (e.g., a ghost image) of the individual to depict physical features of the individual. This first portion of distinct square-wave lines can be used to encode an item of credential data that is a secure facial template of a person that is assigned to the identification document. For example, the secure facial template can be a digital image for representing facial features of the person based on extracted linecode or binary data mapped to the first portion of distinct square-wave lines. The square-wave lines are processed by a decoder device to obtain or extract the various sets of linecode or binary data to generate an image associated with the facial template.

In other examples, a second portion of distinct square-wave lines is included at a second region 360 of the identification document 350 and in a set of background lines at one layer of the identification document. This second portion of distinct square-wave lines can be used to encode an item of credential data that is a government issued identification number linked to the individual or date of birth linked to the individual. For example, the identification number can be a social security number or a driver's license number for a specific state. A user that seeks to verify authenticity of the identification document 350 can do so based on extracted binary data mapped to the second portion of distinct square-wave lines in response to processing the second portion of square-wave lines using the decoder device.

In some other examples, a third portion of distinct square-wave lines is included at a third region 365 of the identification document 350 and in a set of background lines at another layer of the identification document. This third portion of distinct square-wave lines can be used to securely encode an item of credential data that represents a biometric template or attribute linked to the individual. For example, the data for the biometric attribute can represent a person's fingerprint, an iris scan for the person, retinal features of the person, or a combination of each. A user that seeks to verify authenticity of the identification document 350 can do so based on extracted binary data mapped to this third portion of distinct square-wave lines in response to processing the third portion of square-wave lines using the decoder device.

Figure 3D:
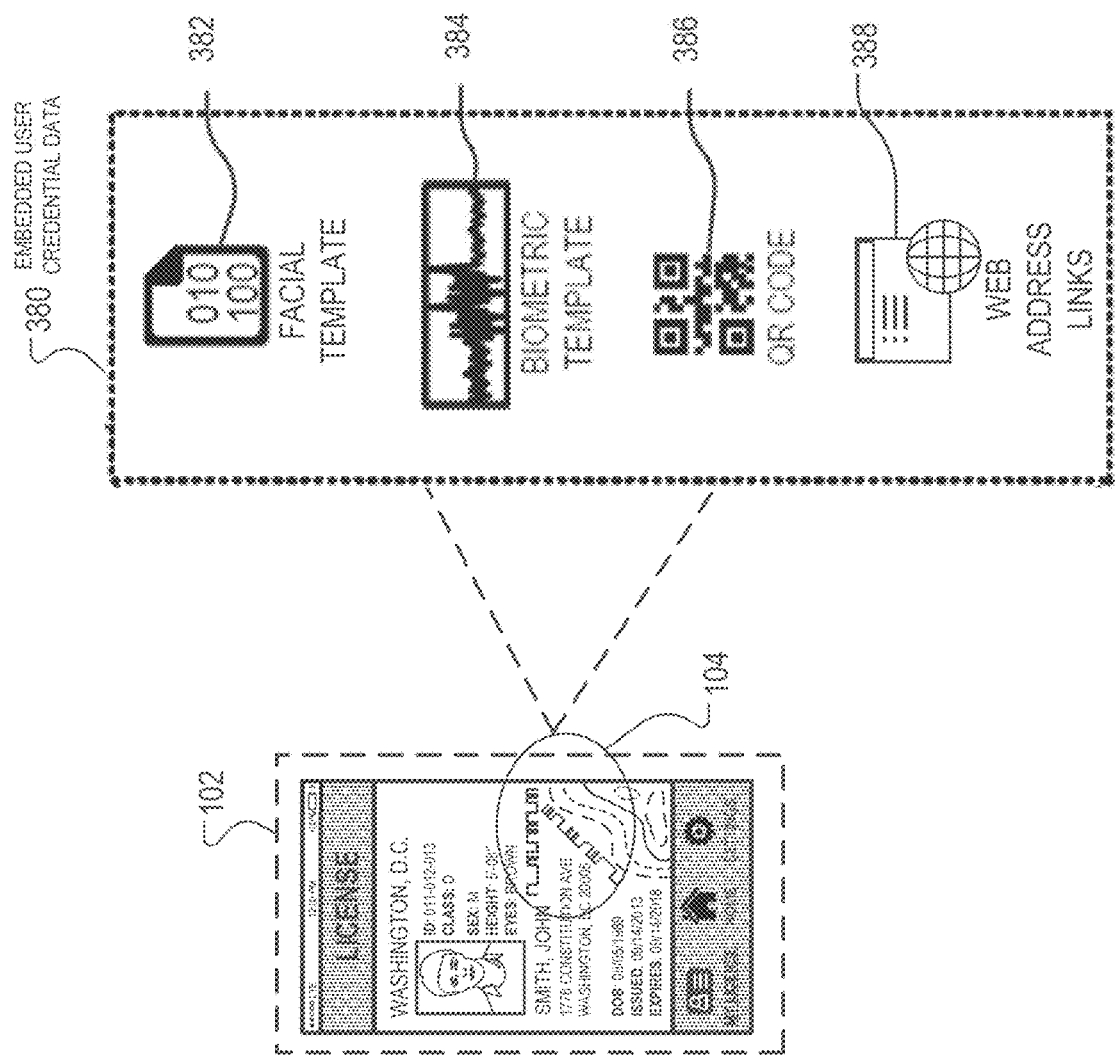
FIG. 3D illustrates example items of credential data that can be encoded on an identification document.

FIG. 3D illustrates example items of credential data 380 that can be encoded on an identification document 102. For example, various items of credential data 380 can be embedded, encoded, or otherwise stored at an identification document using line patterns 104 as well as one or more other methods for embedding information. As described in more detail below, the described techniques provide methods for encoding web address links in line patterns 104 embedded at an identification document. For example, line patterns 104 are used to embed address links, such as uniform resource locators (URLs), application links, or other related web-links for accessing a web-resource. In some implementations, an embedded address link is a URL that points to a website or web server and is used to connect a device to the web server pointed by the URL.

In the implementation of FIG. 3D, credential data 380 includes at least facial template 382, biometric template 384, data encoded by a Quick Response Code 386 ("QR code 386"), and a web address link(s) 388. Other types of credential data are also within the scope of this implementation. Each of the facial template 382, the biometric template 384, and the web address link(s) 388 are encoded at the identification document 102 using line patterns 104.

An example QR code 386 may be a matrix barcode, a two dimensional barcode, or a related machine-readable optical label disposed at region/area of a digital or physical identification document. In some implementations, the QR code 386 provides a method for embedding or encoding credential data that is different than, and separate from, encoding methods enabled by the line patterns 104. In other implementations, the QR code 386 is used in conjunction with the line patterns 104 to encode different combinations of credential data on the identification document 102. In one example, a portion of square-wave lines that form line patterns 104 maybe overlaid on the QR code 386 to encode or embed an item of credential data within the array portions forming the QR code 386.

A wireless device (e.g., detector device 160) may read web address links 388 from an identification document to retrieve a data record from a host, such as identification server 110, issuing authority server 120, or a server for a state department of motor vehicles ("DMV"). The wireless device uses the web address link 388 to configure a request that is sent to a host. The request can be used to support a second stage of processing of the identification document, such as to validate authenticity of the identification document or verify the identity of a person presenting the identification document. In some examples, the wireless device may translate a record number and install the record number in a HTTP Get Request alongside accreditation information so that the wireless device is presented as an accredited device.

In particular, the web address links 388 may be used to retrieve a biometric template for a user assigned to the identification document. For example, a physical identification document may be offered up to a wireless device that reads the web address links 388 in order to retrieve the biometric template from an authentication server. In this manner, the line patterns 104 embedded at the identification document for encoding the web address links 388 are operable to direct the card holder to the authentication server. In some implementations, the line patterns 104 may be placed on any region of a digital or physical identification document and used to embed or encode a URL or web address link 388 that can be processed to obtain or verify credential data associated with a user. In some cases, the web address links 388 may use standard encoding techniques (e.g., numeric, alphanumeric, byte/binary, etc.) to encode a web-link for obtaining data associated with a user presenting an identification document.

For a given URL or web address link, e.g., www.example.com, the linecode generator 114 is operable to encode numbers, letters, or terms into coded values using an example encoding table, for example, the ASCII code table. A variety of encoding methodologies can be used for this encoding operation. In some cases, URL such as www.example.com will be encoded to an example value of: 119 119 119 46 105 100 101 109 105 97 46 99 111 109. The linecode generator 114 is operable to convert the encoded value for the URL to an example binary bit array, such as "0101 0001 1110." The linecode generator 114 is operable to convert the binary bit array to line segments, such as one or more distinct portions of square-wave lines that are used to generate one or more line patterns 104.

In some implementations, the linecode generator 114 uses two predefined segment lengths (or widths) for two distinct line segments to indicate whether a particular line segment is ascribed a "0" bit value (e.g., a short segment) or "1" bit value (e.g., a long segment). For example, a first, short line segment of pixel length, A, is used to indicate a "0" bit value, whereas a second, long line segment of pixel length, B, is used to indicate a "1" bit value. In some implementations, additional bit lengths (or widths) and bit combinations may be used to convert a binary bit array to line segments or distinct square-wave line portions for generating line patterns 104.

For example, the linecode generator 114 may use four predefined segment lengths (or widths) for four distinct line segments to indicate whether a particular line segment is ascribed a "00" binary value, a "01" binary value, a "10" binary value, or a "11" binary value. The line patterns 104 that are formed using these line segments can be integrated at an identification document using a printer, a laser engraver, or embedded in a rendering of a digital identification document displayed on screen.

Figure 4:
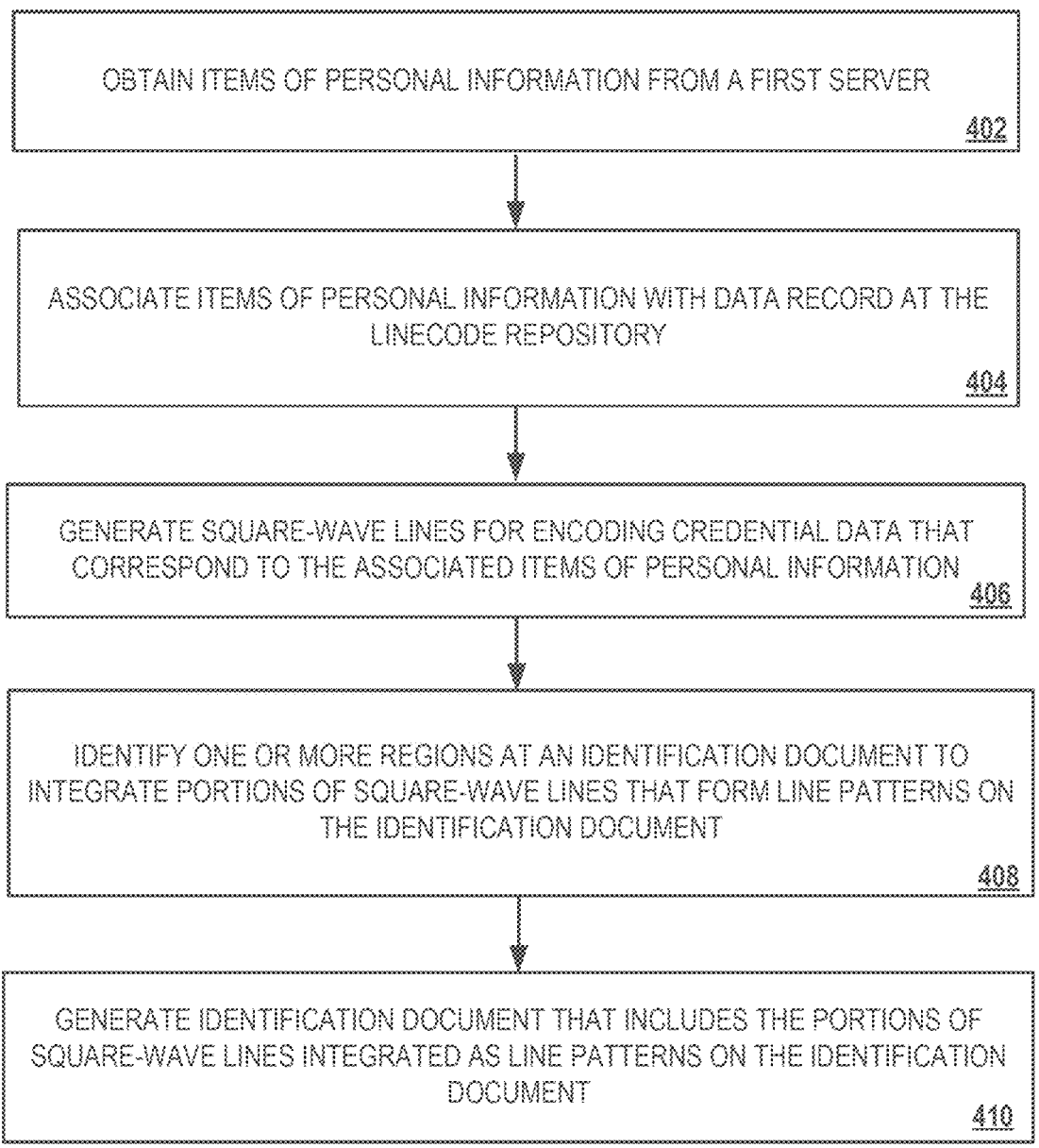
FIG. 4 illustrates an example process for generating identification documents with embedded line patterns.

FIG. 4 illustrates an example process 400 for generating identification documents with embedded line patterns. FIG. 3 shows an example process 400 associated with forecasting performance of a digital campaign. Process 400 can be implemented using one or more computing elements of system 100 described above as well as other components and instructions described in this document.

Process 400 includes the system 150 obtaining items of personal information from a first server (402). For example, the system 150 can obtain one or more items of personal information from the issuing authority server 120 based on one or more of the methods described above.

The system 150 associates items of personal information with a data record (404). For example, the identification server 110 is operable to associate each obtained item of information with a data record stored at the linecode repository 116. A first item of personal information can be a social security number or date of birth that is associated with an example identity record for a person. The system 150 generates square-wave lines for encoding credential data that correspond to the associated items of personal information (406). For example, the linecode generator 114 is operable to generate multiple square-wave lines that form line patterns 104 which are then integrated or embedded at an identification document 102.

The system 150 identifies one or more regions at an identification document to integrate portions of square-wave lines that form line patterns on the identification document (408). For example, the system 150 can receive data representing a new identification document that is to be generated using an example hardware or digital document fabrication device of system 100. The system 150 can identify a first region of the identification document for embedding or integrating, using the linecode generator 114, a first portion of distinct square-wave lines at a first region. In some implementations, the first portion of distinct square-wave lines are embedded in an image of an individual to depict physical features of the individual or to encode an item of credential data that is a facial template or biometric attribute of a person that is assigned to the identification document.

The system 150 generates an identification document that includes the portions of square-wave lines integrated as line patterns on a digital or physical identification document (410). For example, the hardware fabrication device implements processes and operations for generating an identification document in response to integrating square-wave lines for one or more sets of line patterns. For a physical identification document, a laser engraving process can be used to print sets of square-wave lines on the identification document. The square-wave lines of the line patterns can appear blended and immersed with different sets of background lines at one or more layers of a physical identification document.

In some examples, operations of process 400 are performed to encode data in length-modulated square-wave lines. One or more of these operations can be implemented based on algorithms executed by system 150 to transform a set of linecode, e.g., obtained from records in linecode repository 116, into a square waveform by modulating a width, or amplitude, of maximum pulses of the waveform.

The linecode generator 114 uses alignment techniques to conceal or hide starting and ending signals of a linecode. For example, the linecode generator 114 conceals these start and end signals by mirroring the two ends, either cyclically or reversely, and by filling repeated signals to expand linecode segments within a compact region of interest so as to augment an error tolerance associated with detecting and decoding processes.

A line-splitting technique is employed by the linecode generator 114 to automatically break a full-length square-wave line into several smaller line segments given a dimension of the region of interest. In some implementations, an example size of a region of interest is determined based on a percentage of a total surface area of an identification document. For example, a small region of interest can be one percent of a total surface of an identification document.

Figure 5:
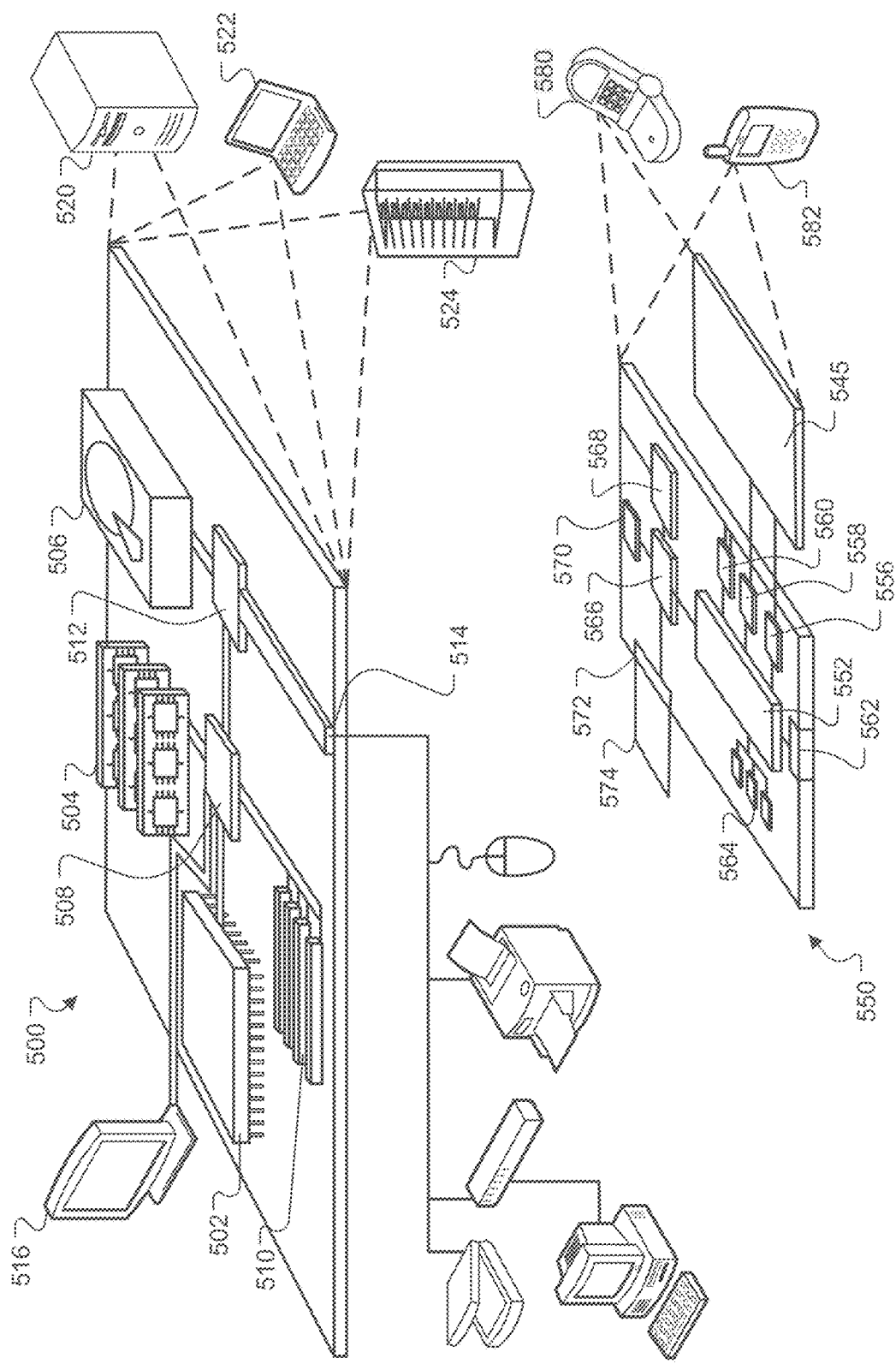
FIG. 5 shows a block diagram of an example computing system that can be used in connection with computer-implemented methods described in this specification.

FIG. 5 is a block diagram of computing devices 500, 550 that may be used to implement the systems and methods described in this document, as either a client or as a server or plurality of servers. Computing device 500 is intended to represent various forms of digital computers, such as laptops, desktops, workstations, personal digital assistants, servers, blade servers, mainframes, and other appropriate computers. Computing device 550 is intended to represent various forms of mobile devices, such as personal digital assistants, cellular telephones, smartphones, smartwatches, head-worn devices, and other similar computing devices. The components shown here, their connections and relationships, and their functions, are meant to be exemplary only, and are not meant to limit implementations described and/or claimed in this document.

Computing device 500 includes a processor 502, memory 504, a storage device 506, a high-speed interface 508 connecting to memory 504 and high-speed expansion ports 510, and a low speed interface 512 connecting to low speed bus 514 and storage device 506. Each of the components 502, 504, 506, 508, 510, and 512, are interconnected using various busses, and may be mounted on a common motherboard or in other manners as appropriate. The processor 502 can process instructions for execution within the computing device 500, including instructions stored in the memory 504 or on the storage device 506 to display graphical information for a GUI on an external input/output device, such as display 516 coupled to high speed interface 508. In other implementations, multiple processors and/or multiple buses may be used, as appropriate, along with multiple memories and types of memory. Also, multiple computing devices 500 may be connected, with each device providing portions of the necessary operations, e.g., as a server bank, a group of blade servers, or a multi-processor system.

The memory 504 stores information within the computing device 500. In one implementation, the memory 504 is a computer-readable medium. In one implementation, the memory 504 is a volatile memory unit or units. In another implementation, the memory 504 is a non-volatile memory unit or units.

The storage device 506 is capable of providing mass storage for the computing device 500. In one implementation, the storage device 506 is a computer-readable medium. In various different implementations, the storage device 506 may be a floppy disk device, a hard disk device, an optical disk device, or a tape device, a flash memory or other similar solid state memory device, or an array of devices, including devices in a storage area network or other configurations. In one implementation, a computer program product is tangibly embodied in an information carrier. The computer program product contains instructions that, when executed, perform one or more methods, such as those described above. The information carrier is a computer- or machine-readable medium, such as the memory 504, the storage device 506, or memory on processor 502.

The high speed controller 508 manages bandwidth-intensive operations for the computing device 500, while the low speed controller 512 manages lower bandwidth-intensive operations. Such allocation of duties is exemplary only. In one implementation, the high-speed controller 508 is coupled to memory 504, display 516, e.g., through a graphics processor or accelerator, and to high-speed expansion ports 510, which may accept various expansion cards (not shown). In the implementation, low-speed controller 512 is coupled to storage device 506 and low-speed expansion port 514. The low-speed expansion port, which may include various communication ports, e.g., USB, Bluetooth, Ethernet, wireless Ethernet, may be coupled to one or more input/output devices, such as a keyboard, a pointing device, a scanner, or a networking device such as a switch or router, e.g., through a network adapter.

The computing device 500 may be implemented in a number of different forms, as shown in the figure. For example, it may be implemented as a standard server 520, or multiple times in a group of such servers. It may also be implemented as part of a rack server system 524. In addition, it may be implemented in a personal computer such as a laptop computer 522. Alternatively, components from computing device 500 may be combined with other components in a mobile device (not shown), such as device 550. Each of such devices may contain one or more of computing device 500, 550, and an entire system may be made up of multiple computing devices 500, 550 communicating with each other.

Computing device 550 includes a processor 552, memory 564, an input/output device such as a display 554, a communication interface 566, and a transceiver 568, among other components. The device 550 may also be provided with a storage device, such as a microdrive or other device, to provide additional storage. Each of the components 550, 552, 564, 554, 566, and 568, are interconnected using various buses, and several of the components may be mounted on a common motherboard or in other manners as appropriate.

The processor 552 can process instructions for execution within the computing device 550, including instructions stored in the memory 564. The processor may also include separate analog and digital processors. The processor may provide, for example, for coordination of the other components of the device 550, such as control of user interfaces, applications run by device 550, and wireless communication by device 550.

Processor 552 may communicate with a user through control interface 558 and display interface 556 coupled to a display 554. The display 554 may be, for example, a TFT LCD display or an OLED display, or other appropriate display technology. The display interface 556 may include appropriate circuitry for driving the display 554 to present graphical and other information to a user. The control interface 558 may receive commands from a user and convert them for submission to the processor 552. In addition, an external interface 562 may be provided in communication with processor 552, so as to enable near area communication of device 550 with other devices. External interface 562 may provide, for example, for wired communication, e.g., via a docking procedure, or for wireless communication, e.g., via Bluetooth or other such technologies.

The memory 564 stores information within the computing device 550. In one implementation, the memory 564 is a computer-readable medium. In one implementation, the memory 564 is a volatile memory unit or units. In another implementation, the memory 564 is a non-volatile memory unit or units. Expansion memory 574 may also be provided and connected to device 550 through expansion interface 572, which may include, for example, a SIMM card interface. Such expansion memory 574 may provide extra storage space for device 550, or may also store applications or other information for device 550. Specifically, expansion memory 574 may include instructions to carry out or supplement the processes described above, and may include secure information also. Thus, for example, expansion memory 574 may be provided as a security module for device 550, and may be programmed with instructions that permit secure use of device 550. In addition, secure applications may be provided via the SIMM cards, along with additional information, such as placing identifying information on the SIMM card in a non-hackable manner.

The memory may include for example, flash memory and/or MRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 564, expansion memory 574, or memory on processor 552.

Device 550 may communicate wirelessly through communication interface 566, which may include digital signal processing circuitry where necessary. Communication interface 566 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 568. In addition, short-range communication may occur, such as using a Bluetooth, WiFi, or other such transceiver (not shown). In addition, GPS receiver module 570 may provide additional wireless data to device 550, which may be used as appropriate by applications running on device 550.

Device 550 may also communicate audibly using audio codec 560, which may receive spoken information from a user and convert it to usable digital information. Audio codec 560 may likewise generate audible sound for a user, such as through a speaker, e.g., in a handset of device 550. Such sound may include sound from voice telephone calls, may include recorded sound, e.g., voice messages, music files, etc., and may also include sound generated by applications operating on device 550.

The computing device 550 may be implemented in a number of different forms, as shown in the figure. For example, it may be implemented as a cellular telephone 580. It may also be implemented as part of a smartphone 582, personal digital assistant, or other similar mobile device.

Various implementations of the systems and techniques described here can be realized in digital electronic circuitry, integrated circuitry, specially designed ASICs, computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs, also known as programs, software, software applications or code, include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device, e.g., magnetic discs, optical disks, memory, Programmable Logic Devices (PLDs) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

The systems and techniques described here can be implemented in a computing system that includes a back end component, e.g., as a data server, or that includes a middleware component such as an application server, or that includes a front end component such as a client computer having a graphical user interface or a Web browser through which a user can interact with an implementation of the systems and techniques described here, or any combination of such back end, middleware, or front end components. The components of the system can be interconnected by any form or medium of digital data communication such as, a communication network. Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

In addition, certain data may be treated in one or more ways before it is stored or used, so that personally identifiable information is removed. For example, in some embodiments, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over what information is collected about the user, how that information is used, and what information is provided to the user.

A number of embodiments have been described. Nevertheless, it will be understood that various modifications may be made without departing from the spirit and scope of the invention. Accordingly, other embodiments are within the scope of the following claims. While this specification contains many specific implementation details, these should not be construed as limitations on the scope of what may be claimed, but rather as descriptions of features that may be specific to particular embodiments. Certain features that are described in this specification in the context of separate embodiments can also be implemented in combination in a single embodiment.

Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, some processes depicted in the accompanying figures do not necessarily require the particular order shown, or sequential order, to achieve desirable results.

What is claimed is:

1. An identification document comprising:
   personal information associated with the individual; and
   line patterns comprising:
   a plurality of distinct square-wave lines operable to store, at the identification document, credential data about a person assigned to the identification document; and
   wherein a first portion of distinct square-wave lines encodes a first item of credential data and is used to determine whether the personal information corresponds to the first item of credential data.

2. The identification document of claim 1, further comprising:
   an image of an individual; and
   wherein a second portion of distinct square-wave lines encodes a second item of credential data and is used to determine whether the image of the individual corresponds to the second item of credential data.

3. The identification document of claim 1, wherein each line pattern included at the identification document corresponds to an imperceptible square-wave that is embedded at the identification document to encode the credential data associated with the individual.

4. The identification document of claim 1, wherein the line patterns are formed from square-wave lines that are integrated at particular regions of the identification document to provide a secure means of storing, at the identification document, respective items of credential data.

5. The identification document of claim 4, wherein each respective item of credential data is associated with a distinct portion of personal information about a person or entity that is assigned to the identification document.

6. The identification document of claim 2, wherein the first portion of distinct square-wave lines are included at a first region of the identification document and in the image of the individual to depict physical features of the individual.

7. The identification document of claim 6, wherein the second portion of distinct square-wave lines are included at a second, different region of the identification document with one or more background lines of the identification document.

8. The identification document of claim 2, wherein the first item of credential data is at least one of:
   i) a secure facial template of the person that is assigned to the identification document; or
   ii) a web address link that that enables a detector device to obtain a corresponding data record comprising identifying information about the person assigned to the identification document.

9. The identification document of claim 8, wherein the second item of credential data is a government issued identification number that is linked to the individual or data representing a biometric attribute of the person.

10. A method for generating an identification document, the method comprising:
    obtaining personal information about an individual;
    determining a mapping of respective items of the personal information to a line pattern that is operable to encode the personal information; and
    generating the identification document using the personal information and the line pattern, comprising:
    i) embedding, at the identification document, a plurality of distinct square-wave lines that form the line pattern, wherein a first portion of distinct square-wave lines are operable to store a first item of the personal information at the identification document; and
    ii) integrating, at the identification document, a second item of the personal information with the first item in response to printing the personal information on the identification document.

11. The method of claim 10, wherein the first portion of distinct square-wave lines encodes the first item of the personal information at the identification document and the method comprises:
    determining whether credential data representing the first item corresponds to the personal information printed on the identification document.

12. The method of claim 11, wherein:
    obtaining the personal information comprises obtaining an image of the individual;
    the personal information printed on the identification document includes the image;
    the first item of the personal information corresponds to the image; and
    the credential data is a secure facial template.

13. The method of claim 12, wherein determining whether the credential data representing the first item corresponds to the personal information printed on the identification document comprises:
    determining whether the secure facial template corresponds to the image printed on the identification document.

14. The method of claim 13, wherein the first portion of distinct square-wave lines are included at a first region of the identification document and the method comprises:

embedding, at the identification document, a second portion of distinct square-wave lines that form the line pattern, wherein the second portion of distinct square-wave lines are:

operable to store a third item of the personal information at the identification document; and are embedded in the image of the individual.

15. The method of claim 10, wherein the line pattern is an imperceptible square-wave that is embedded at the identification document to encode credential data corresponding to a plurality of items of personal information about the individual.

16. The method of claim 10, wherein:

the line pattern is formed from square-wave lines that are integrated at particular regions of the identification document to provide a secure means of storing respective items of credential data at the identification document; and each respective item of credential data is associated with a distinct item of personal information about a person or entity that is assigned to the identification document.

17. A system comprising:

one or more processing devices; and one or more non-transitory machine-readable storage devices storing instructions that are executable by the one or more processing devices to cause performance of operations comprising:

obtaining personal information about an individual;

determining a mapping of respective items of the personal information to a line pattern that is operable to encode the personal information; and generating the identification document using the personal information and the line pattern, comprising:

i) embedding, at the identification document, a plurality of distinct square-wave lines that form the line pattern, wherein a first portion of distinct square-wave lines are operable to store a first item of the personal information at the identification document; and ii) integrating, at the identification document, a second item of the personal information with the first item in response to printing the personal information on the identification document.

18. The system of claim 17, wherein the first portion of distinct square-wave lines encodes the first item of the personal information at the identification document and the operations further comprises:

determining whether credential data representing the first item corresponds to the personal information printed on the identification document.

19. The system of claim 18, wherein:

obtaining the personal information comprises obtaining an image of the individual;

the personal information printed on the identification document includes the image;

the first item of the personal information corresponds to the image; and the credential data is a secure facial template.

20. The system of claim 19, wherein determining whether the credential data representing the first item corresponds to the personal information printed on the identification document comprises:

determining whether the secure facial template corresponds to the image printed on the identification document.

* * * * *